United States Patent [19]
Rub et al.

[11] Patent Number: 6,061,193
[45] Date of Patent: May 9, 2000

[54] METHOD AND APPARATUS FOR DETECTION IN DIGITAL MAGNETIC RECORDING

[75] Inventors: Bernardo Rub, Edina; Hamid R. Shafiee, Bloomington; Robert E. Kost, Minneapolis, all of Minn.

[73] Assignee: Seagate Technology, Inc., Shakopee, Minn.

[21] Appl. No.: 08/921,138

[22] Filed: Aug. 29, 1997

Related U.S. Application Data

[60] Provisional application No. 60/035,957, Jan. 21, 1997.

[51] Int. Cl.$^7$ ............................... G11B 5/09; G11B 5/035
[52] U.S. Cl. ............................... 360/46; 360/65; 375/233
[58] Field of Search ........................ 360/46, 65; 375/233, 375/341

[56] References Cited

U.S. PATENT DOCUMENTS

| | | | |
|---|---|---|---|
| 4,789,994 | 12/1988 | Randall et al. | 375/12 |
| 5,341,386 | 8/1994 | Shimoda et al. | 371/43 |
| 5,451,943 | 9/1995 | Satomura | 341/58 |
| 5,502,735 | 3/1996 | Cooper | 371/43 |
| 5,539,774 | 7/1996 | Nobakht et al. | 375/232 |
| 5,576,707 | 11/1996 | Zook | 341/58 |

OTHER PUBLICATIONS

"A High Dimensional Signal Space Implementation of FDTS/DF" by Barrett Brickner and Jaekyun Moon, *IEEE Transactions on Magnetic*, vol. 32, No. 5, Sep. 1996, pp. 3941–3943.

"Maximum Transition Run Codes for Data Storage Systems" by Jaekyun Moon and Barrett Brickner, *IEEE Transactions on Magnetic*, vol. 32, No. 5, Sep. 1996, pp. 3992–3994.

*Primary Examiner*—W. Chris Kim
*Attorney, Agent, or Firm*—Westman, Champlin & Kelly P.A.

[57] ABSTRACT

A detector in an informational handling system and a method of detection is provided. An input circuit is used to receive an input signal. A second circuit determines boundaries based on the input signal. However, at least two of the boundaries specified by the second circuit are monotonically related to each other. The detector can be implemented in a magnetic disc drive. A read circuit is operably coupled to the disc to read data stored on the disc. The read circuit includes an input circuit, a boundary calculation circuit, and a logic circuit operably coupled to one another. The input circuit serves to receive the data and provide an input to the boundary calculation circuit. The boundary calculation circuit calculates several boundaries based on the input. At least two of the boundaries are monotonically related. The boundary circuit provides an output to the logic circuit which provides a binary decision.

18 Claims, 5 Drawing Sheets

METHOD AND APPARATUS FOR DETECTION IN DIGITAL MAGNETIC RECORDING

REFERENCE TO RELATED APPLICATION

The present application is based on a provisional application Ser. No. 60/035,957 filed on Jan. 21, 1997.

FIELD OF THE INVENTION

The present invention relates to a detector in an informational handling system such as a magnetic disc drive. More specifically, the present invention relates to systems for storing and retrieving digitized data on magnetic storage media or a disc array subsystem.

BACKGROUND OF THE INVENTION

Computer systems often employ magnetic disc drives to store information such as computer programs or data. Magnetic disc drives typically include a transducing data head mounted on a slider that "flies" over the surface of a rotating rigid magnetic disc. The data head is positioned over a selected portion of the disc by a drive controller operating an actuator. The data head generates magnetic fields which are impressed onto the disc surface during the writing of information and senses magnetic fields from the disc surface during the readback of information.

The head writes digital data to the disc, for example, through modulation of a current in a head coil where the current corresponds with the magnetic flux transitions that represent the digital data. When reading the recorded data, the head again passes over the disc surface and transduces the magnetic transitions into voltage pulses in an analog read signal. The written data sequence is recovered after processing of the analog read signal.

Prior to recording data on a disc surface, the digital data bits are encoded so that certain constraints are enforced on the bit stream impressed on the disc. Encoding the data provides clocking and automatic gain control information, which is used for data recovery. To perform the timing and gain control, the number of consecutive "zero" samples of the bit stream is limited because timing and control information is preferably derived when non-zero samples are read. For example, (d,k) run-length-limited (RLL) codes separate "1"s by at least d and at most k, "0"s. Prior art codes, for example those used in Partial Response class IV channels, utilize intersymbol interference (ISI) in such a manner as to make unnecessary the d constraint, i.e., d=0. The k constraint is still required to provide timing and control information. Errors in sequence detectors arise mostly due to the detector's inability to distinguish the minimum distance transition patterns. A (1,k) code can be used to eliminate the minimum distance error event in certain detectors, but the rate penalty is typically too large to provide any appreciable coding gain unless the linear density is very high.

A particular code, now known in the art, that improves the minimum distance properties of maximum likelihood sequence detectors operating at higher linear densities is called the Maximum Transition Run (MTR) code. An example of such an MTR code is set forth in Jaekyun Moon and Barrett Brickner, "Maximum Transition Run Codes for Data Storage Systems," 32 *IEEE Transactions on Magnetics*, 3992 (September 1996). In certain cases, the MTR code possesses the similar beneficial distance-gaining properties of the (1, k) code over the (0,k) code, but can be implemented with appreciably higher rates. The MTR code eliminates data patterns producing three or more consecutive transitions while imposing a k constraint to assure that the gain and timing loops are updated with adequate frequency. For example, a (2;9) MTR code with rate 6/7, which encodes binary data represented as a six bit data byte into a seven bit code word, used in connection with a non-return-to-zero-inverse (NRZI) modulation convention, has been developed.

One approach to detection in an informational handling system such as a magnetic disc drive is to use a geometric interpretation in which each of m observation variables corresponds to a coordinate in m-dimensional space. The space is then divided into regions corresponding to possible outputs. This concept has been used to design fixed delay tree search with decision feedback (FDTS/DF) detectors. The procedure for designing FDTS/DF as a high dimensional detector includes finding boundaries in space for various pairs of symbols corresponding with different detector outputs, eliminating those boundaries that are redundant, and mapping the regions in space formed by the boundaries to the detector output via a logic function.

Decision boundary design and boundary selection are important considerations in the implementation of FDTS/DF detectors. An optimum decision boundary for a pair of symbols corresponding to different detector outputs is everywhere equidistant from the two points. Once the boundaries are determined, the complexity of the detector can be reduced with the removal of some selected boundaries without degrading the detector performance significantly. For example, the boundaries corresponding to the more distant pairs of symbols can be eliminated. To determine which boundaries can be eliminated, a rank order list of boundaries is determined. First, the boundaries are listed in order of increasing distance from the symbol pair that generated the boundary. Then, the boundaries are removed in order of decreasing distance until the performance of the detector begins to degrade.

A detector structure implementing a design similar to that described above has been developed and is known in the art as a Full FDTS/DF detector. This detector for an RLL d=0 coded channel includes five multipliers providing seven decisional boundaries to a logic circuit.

In addition to improved performance over prior art detectors, the Full FDTS/DF detector is characterized by its complexity. Particularly, the five multipliers and related hardware are relatively cumbersome to implement, as is the logic circuit to which seven boundaries are provided. In order to simplify detector architecture, those skilled in the art have sought to effect the performance of a Full FDTS/DF detector through the use of less than all of its decisional boundaries, i.e., a subset of the seven decisional boundaries of the Full FDTS/DF detector.

A simplified detection system which is based on a subset of three decisional boundaries of the Full FDTS/DF detector has been developed. The simplified detection system is premised on the realization that the Full FDTS/DF detector is sensitive to changes in the channel response that alter which set of symbol pairs constitute the smallest set. To fix the symbol pairs that generate the required boundaries, a constraint can be placed on the channel impulse response. The natural (i.e., unconstrained) channel response at user densities of 2.5 indicates that the first two samples are nearly equal, and the third sample is close to zero. Consequently, to operate at a density of 2.5, equalization of the impulse response can be constrained to the target values of 1, 1 and 0. The constrained pulse response results in constrained decisional boundaries. Application of the equalization target to the Full FDTS/DF results in a simplified detector where the constrained boundaries can be determined without multipliers.

A channel to implement this simplified detection system has been proposed, and is referred to in the art as a "3D-110" channel. In the 3D-110 channel, a filter is used to remove all the precursor intersymbol interference (ISI) terms. All post-cursor ISI terms except the first two, are removed using a feedback filter. The channel constrains the two remaining post-cursor ISI terms, i.e., $f_1$ and $f_2$, to be one and zero. The main tap, i.e., $f_0$, of the pulse response is normalized to one, and, assuming all previous decisions to be correct, the filters result in an equivalent discrete time channel with a "110" response for $f_0$, $f_1$ and $f_2$.

The detector of the 3D-110 channel is a simplified implementation of the Full FDTS/DF detector. When the three dimensional FDTS/DF described above is provided with a "110" response and MTR coding, the result is a detector which makes use of only three decisional boundaries, as opposed to seven. Furthermore, the detector does not require multipliers and one of the decisional boundaries has a zero offset term. The 3D-110 detector uses three slicers, three adders, and two two-input multiplexers to provide three decisional boundaries to a logic circuit. Thus, the 3D-110 detector can be constructed with a dramatically simplified architecture over the Full FDTS/DF detector. However, the 3D-110 detector operates in the same way a Full FDTS/DF detector would if provided with a "110" response and MTR coding. The overall steps for deriving the 3D-110 detector architecture from the Full FDTS/DF implementation are determining channel impulse response, appropriately constraining the channel impulse response, and simplifying the architecture based on the constraint where only a subset of the original seven boundaries remain.

The 3D-110 channel provides significant advantages in performance and simplicity over other detectors. The 3D-110 channel achieves the performance of the more complicated Full FDTS/DF (of depth 2) at high densities, i.e, densities of 2.5 and above. However, the Full FDTS/DF detector outperforms the 3D-110 channel at lower densities. The "110" target carried out in the 3D-110 channel is close to the magnetic channel natural response at high densities, but is not particularly suited for use at lower densities, i.e., densities less than 2.25.

Consequently, a need exists for a channel that has improved performance over prior art detectors at both high and low densities but which can be implemented in a more simplified architecture than the Full FDTS/DF detector. The present invention is directed to a system that provides a solution to this and other problems, and offers other advantages over the prior art.

SUMMARY OF THE INVENTION

The present invention is directed to a detector in an informational handling system and a method of detection. An input circuit is used to receive an input signal. A second circuit determines boundaries based on the input signal. However, at least two of the boundaries specified by the second circuit are monotonically related to each other. The present invention can be implemented in a magnetic disc drive. A read circuit is operably coupled to the disc to read data stored on the disc. The read circuit includes an input circuit, a boundary calculation circuit, and a logic circuit operably coupled to one another. The input circuit serves to receive the data and provide an input to the boundary calculation circuit. The boundary calculation circuit calculates several boundaries based on the input. At least two of the boundaries are monotonically related. The boundary circuit provides an output to the logic circuit which provides a binary decision.

DETAILED DESCRIPTION OF THE PREFERRED EMBODIMENTS

Figure 1:
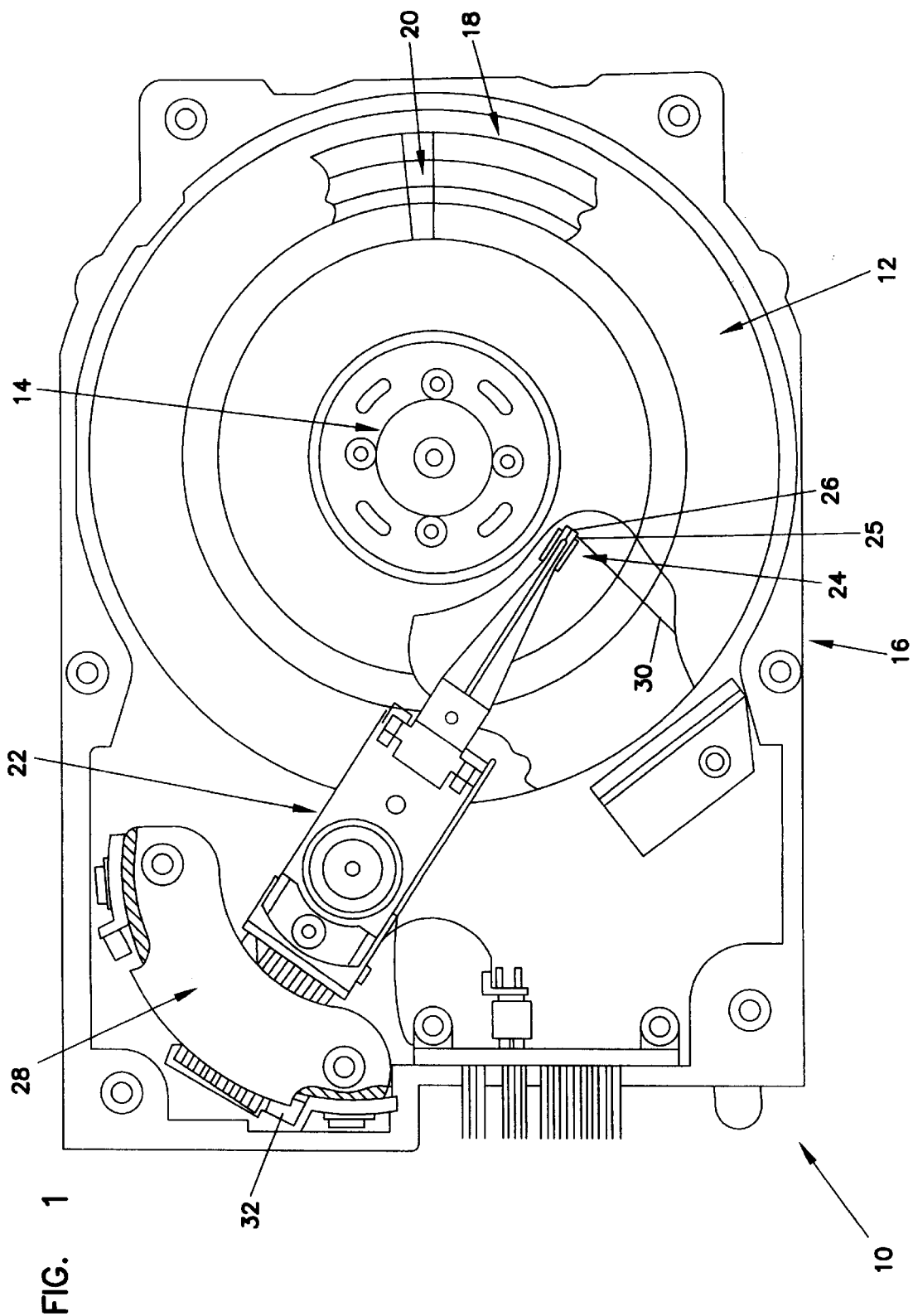
FIG. 1 is a top view of a disc drive with its upper casing removed and embodying features of the present invention.

Referring to FIG. 1, a rotary magnetic disc drive system suitable for incorporating the teachings of the present invention is shown in diagrammatic form and is referred to generally at 110. A plurality of magnetic information storage discs 112 are journaled about a spindle motor assembly 114 within a housing 116. Each magnetic disc 112 has a multiplicity of concentric circular recording tracks, indicated schematically at 118 for recording information. Each track 118 is subdivided into a plurality of sectors, indicated schematically at 120. Data can be stored on or retrieved from the discs 112 by referencing a specific track 118 and sector 120. An actuator arm assembly 122 is rotatably mounted preferably in one corner of the housing 116. The actuator arm assembly 122 carries a plurality of head gimbal assemblies 124 that each carry a slider 125 having a read/write head, or transducer 126, for reading information from and writing information onto the magnetic discs 112. A voice coil motor 128 is adapted to precisely rotate the actuator arm assembly 122 back and forth such that the transducers 126 move across the magnetic discs 112 along arc 130.

Figure 2:
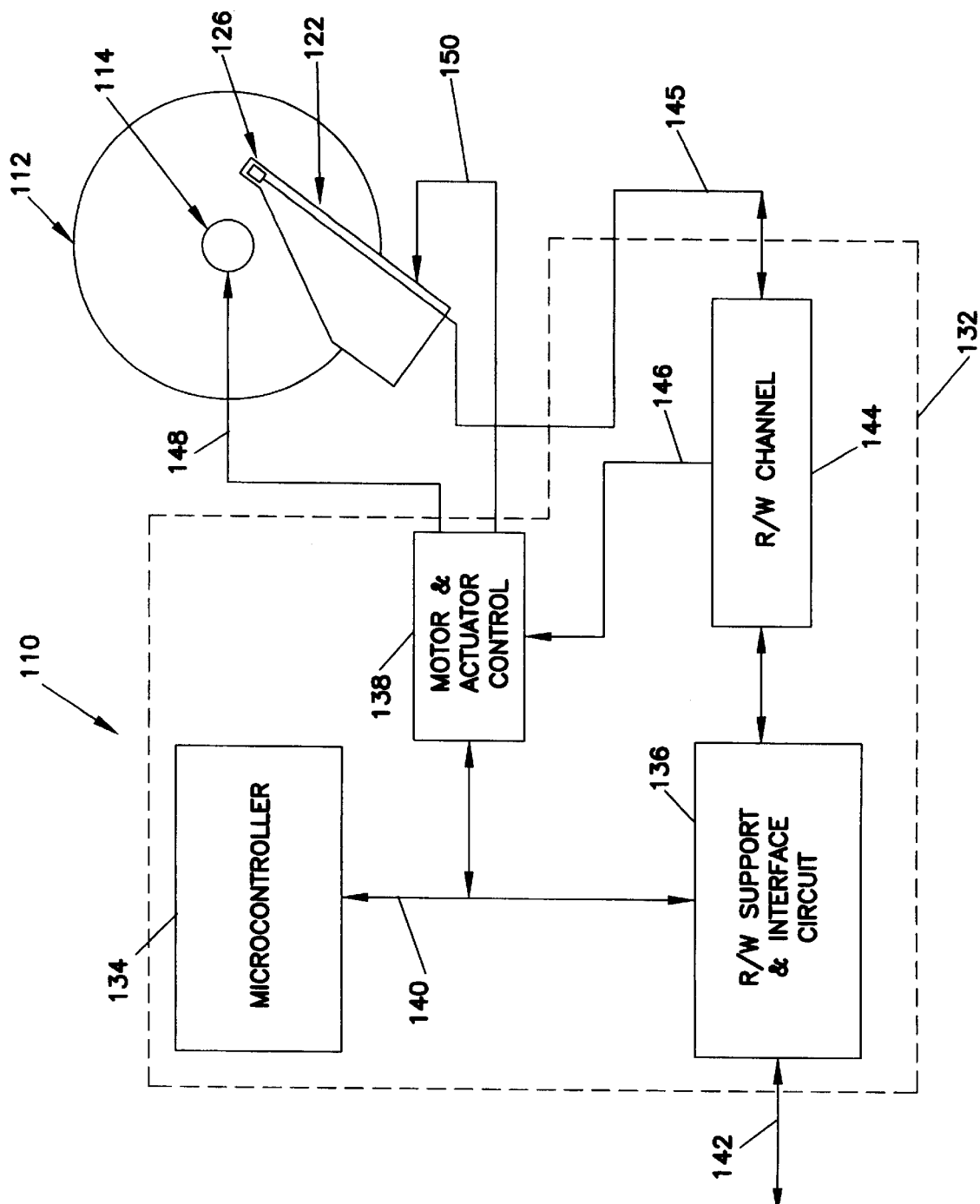
FIG. 2 is a high level block diagram of the disc drive of FIG. 1.

FIG. 2 shows a high level block diagram of the control circuitry 132 of disc drive system 110. The disc drive system 110 includes control circuitry 132 for controlling the position of the transducers 126 and for processing information to be written to or received from the discs 112. A microcontroller 134 directly implements all of the primary functions of the disc drive system 110. A read/write support and interface control circuit, indicated generally at 136, and a motor and actuator controller 138 are connected to the microcontroller 134 by a general purpose data, address, and control bus 140. Circuit 136 in general provides a hardware interface between the disc drive system 110 and a host computer system (not shown) via a communications bus 142. Also, circuit 136 in general provides an interface between the motor and actuator controller 138 and a read/write channel 144. The read/write channel 144 acts as an interface between the microcontroller 134 and the transducers 126 over lines 145. The read/write channel 144 also provides signals over line 146 to the motor and actuator controller 138. Controller 138 is provided as an interface between the microcontroller 134 and the motor assembly 114 over lines 148, and an interface between the microcontroller 134 and the actuator arm assembly 122 over lines 150.

Figure 3:
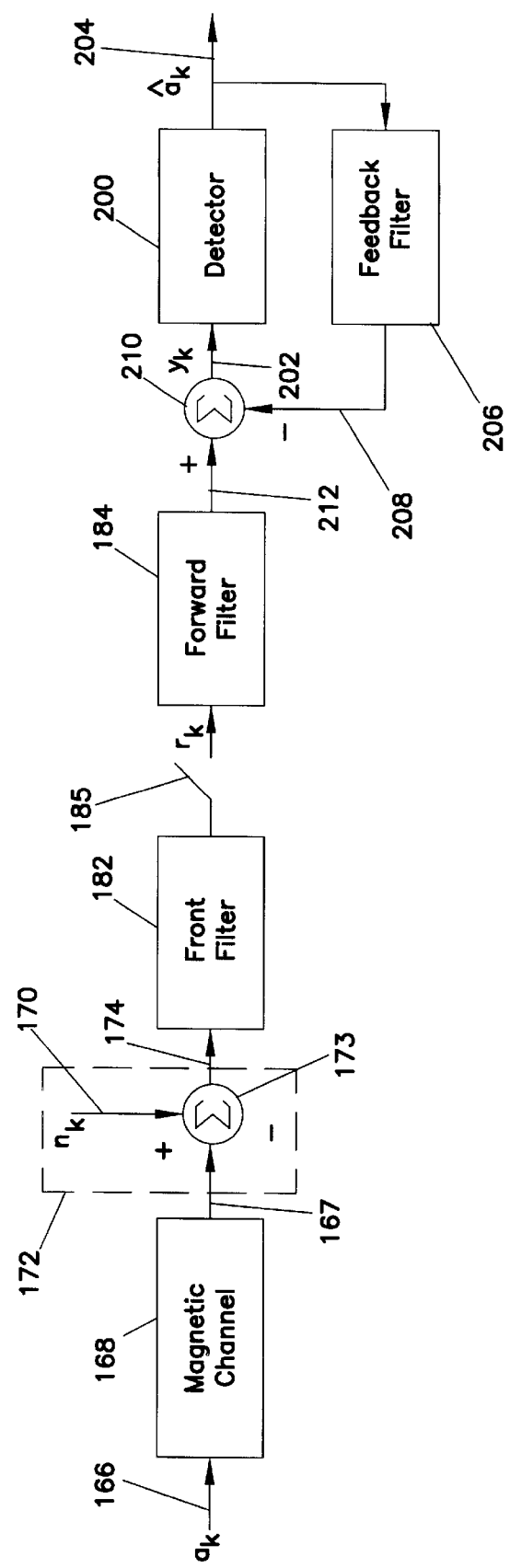
FIG. 3 is a block diagram of a portion of the disc drive of FIG. 1.

FIG. 3 shows a block diagram of a linear channel 155 embodying features of the present invention, wherein the channel 155 is generally included in the read/write channel 144 of FIG. 2. The channel input is a non-return-to-zero inverse (NRZI) sequence, where an input data bit at time k, represented by $a_k$, is provided on input 166 to a magnetic channel 168. The magnetic channel 168 provides output 167, or readback signal, which is corrupted by noise $n_k$ 170. The process of this noise corruption is modeled in phantom as 172. For example, adder 173 shown connected to output 167 and noise 170 is only representative, and is not included in the actual hardware. The noise 170 is present in the readback process, and becomes part of the readback signal 174. The readback signal 174 is provided to a front filter 182, where the output 183 of the front filter 182 is selectively provided to a forward filter 184 the process of which is denoted by $r_k$ 185. The front filter 182 can be an analog low-pass filter. The forward filter 184 can be any filter which, in combination with the other filtering, works as a whitened, matched filter so that the noise at the detector input is whitened. An example is a finite-impulse-response (FIR) filter that includes a plurality of taps.

A preferred embodiment of a detector suitable for incorporating the teachings of the present invention is shown at 200, having a detector input 202 shown as $Y_k$ and an output signal 204 shown as $\hat{a}_k$. The detector output 204 is provided to feedback filter 206. Feedback filter 206 is used to provide a signal 208 to adder 210. Adder 210 receives the output signal 208 and a signal 212 provided by the forward filter 184 to produce the detector input $Y_k$ 202. Feedback filter output 208 is subtracted from forward filter output 212 to produce detector input signal 202. The forward filter 184 removes all precursor inter-symbol interference (ISI). Postcursor ISI terms are permitted to assume their natural values because no constraints are enforced on the channel coefficients. The feedback filter 206 removes all but two postcursor ISI terms, i.e., $f_1$ and $f_2$.

An approach for designing a three-dimensional detector incorporating the teachings of the present invention is set forth here and described below. In general, the procedure includes determining boundaries which assume the form of slicer planes, eliminating redundant boundaries, and mapping the regions in spaced formed by the boundaries to the detector output with a logic function. Rather than constrain the target shape to a particular response, the preferred embodiments of the present invention can operate as a function of a natural impulse response. Additionally, rather than use a subset of the boundaries implemented in the prior art, the described versions of the present invention transform the boundaries of the prior art into fewer boundaries through remodeling, or fitting the boundaries as described below.

Assuming all previous decisions made by the detector 200 are correct, the equivalent discrete-time channel response includes three terms and is denoted as $(1, f_1, f_2)$, where the main tap, i.e., $f_0$, is normalized to one, without any loss of generality. At time k, the noiseless input $Y_k$ 202 to the detector 200, can be written as:

$$y_k = a_k + f_1 a_{k-1} + f_2 a_{k-2} \qquad \text{Equation 1}$$

The detector 200 makes decisions on the input bits by partitioning a three-dimensional signal space. Generally, the signal space is divided into two regions, each of which correspond to a decision of a "+1" or a "−1" for the input bit to be detected. Depending on where the vector of the received signal falls in signal space, a binary decision is released.

To arrive at the final decision boundaries for the detector, the following additional parameters are set forth:

$$y'_{k-1} = a_{k-1} + f_1 a_{k-2} \qquad \text{Equation 2}$$

$$y''_{k-2} = a_{k-2} \qquad \text{Equation 3}$$

Here, $Y'_{k-1}$ and $Y''_{k-2}$ denote detector inputs at times k−1 and k−2 with ISI due to available decisions, i.e., $a_{k-3}$ and $a_{k-4}$ at time k, cancelled. Also, $Y_k$, $Y'_{k-1}$ and $Y''_{k-2}$ comprise the three orthogonal axes of the signal space. At each time k in the detection process, the detector needs to make a decision on the input bit $a_{k-2}$.

Figure 4:
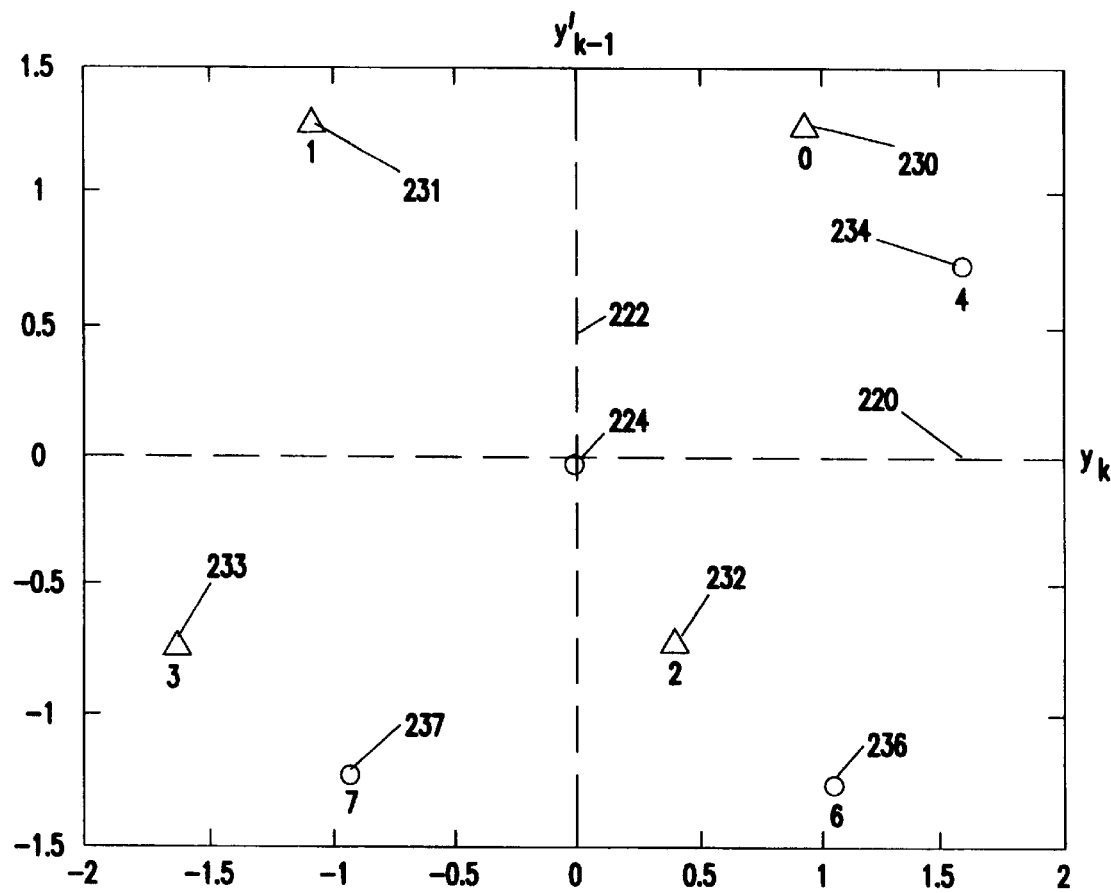
FIG. 4 is a graph of a symbol constellation.

FIG. 4 shows a symbol constellation for a Lorentzian channel at a symbol density of 2.25 with $a_{k-3} = +1$. The $Y_k$ axis is referred to generally as 220, and the $Y'_{k-1}$ axis is referred to generally as 222. The $Y''_{k-2}$ axis extends out of the figure, and is referred to generally as 224. The symbols which correspond to $Y''_{k-2} = +1$ are denoted by triangles, and are referred to as 230, 231, 232, 233. The symbols which correspond to $Y''_{k-2} = -1$ are denoted by circles, and are referred to as 234, 236, 237.

The symbols 230–234, 236–237 also correspond with an index shown in FIG. 4. Table 1, below indicates the input bits that correspond with the index number of the symbols, and the respective reference numbers in the FIG. 4.

TABLE 1

| | | Input Data Bits | | |
|---|---|---|---|---|
| Index | Ref. No. | $a_{k-2}$ | $a_{k-1}$ | $a_k$ |
| 0 | 230 | 1 | 1 | 1 |
| 1 | 231 | 1 | 1 | −1 |
| 2 | 232 | 1 | −1 | 1 |
| 3 | 233 | 1 | −1 | −1 |
| 4 | 234 | −1 | 1 | 1 |
| 5* | | −1 | 1 | −1 |
| 6 | 236 | −1 | −1 | 1 |
| 7 | 237 | −1 | −1 | −1 |

*Note, as given, index number 5 violates the MTR constraint (for $a_{k-3}$ = +1) because of three consecutive transitions and thus is removed from the constellation of FIG. 4.

In the geometric interpretation employed herein, each pair of symbols that correspond to 1 and −1 are to be separated by a boundary in the form of a slicer plane. The detection is simplified if some selected boundaries are removed without significant degradation in performance. In the preferred embodiment, the number of slicer planes is ultimately reduced to three. Two of these slicer planes are monotonically related.

The optimum decision boundary for a pair of symbols corresponding to different detector outputs is everywhere equidistant from the two points. Initially, four conceptual decision boundaries are considered, and denoted as A, B, C and D. The optimal decision boundaries are planes bisecting the line which connects pairs of symbols of interest. In the present invention, planes A and B rotate perpendicular to the $Y'_{k-1}Y''_{k-2}$ plane. In other words, the projection of planes A and B onto the $Y'_{k-1}Y''_{k-2}$ plane is a line. The direction of this projected line will change as the planes are allowed to rotate. The optimal direction of the plane is set so that its projection is perpendicular to the line joining the projected pairs of symbols of interest. Thus, all points on the projected line have the same distance from the projected pair of symbols.

If coordinates of the two symbols in the $Y'_{k-1}Y''_{k-2}$ plane are denoted $(p_1, +1)$ and $(p_2, -1)$, the equation of the plane can be obtained by writing:

$$(y'_{k-1} - p_1)^2 + (y''_{k-2} - 1)^2 = (y'_{k-1} - p_2)^2 + (y''_{k-2} + 1)^2 \qquad \text{Equation 4}$$

And, consequently:

$$-y''_{k-2} - 0.5 y'_{k-1}(p_1 p_2) + 0.25(p_1^2 - p_2) = 0 \quad \text{Equation 5}$$

For plane A, which slices index symbols 0 and 4, i.e., 230 and 234 of FIG. 3, this yields:

$$y''_{k-2} + f_1 y'_{k-1} - f_1 = 0$$

where Equation 2, above, is used to write $p_1$ and $p_2$ as functions of $a_{k-1}$ and $a_{k-2}$. Similarly, the equation for slicer plane B, which separates index symbols 2 and 6 (232 and 236), in addition to symbols 3 and 7 (233 and 237), can be found to be:

$$y''_{k-2} + f_1 y'_{k-1} + f_1 0$$

Thus, boundaries A and B, i.e., planes A and B, are monotonically related.

Slicer planes C and D rotate perpendicular to the $y_k y''_{k-2}$ plane. The equations for these planes can be found in the same manner as above, by equating the distance from each point on the plane to the projection of the two symbols of interest. Slicer plane D separates index symbols 2 and 4 (232 and 234).

Application of the procedure described above results in the following four boundary equations:

A: sgn $(y''_{k-2} + f_1 y'_{k-1} - f_1)$

B: sgn $(y''_{k-2} + f_1 y'_{k-1} + f_1)$

C: sgn $(y''_{k-2} - (f_1 - f_2) y_k - (f_1 - f_2))$, $a_{k-3} = -1$

D: sgn $(y''_{k-2} - (f_1 f_2) y_k + (f_1 - f_2))$, $a_{k-3} = +1$

In one implementation of the present invention, a logic circuit can provide an output based on boundaries A, B and one of C and D (based on $a_{k-3}$). In this version, four boundaries are coupled to the logic circuit, which provides an output based on three of them.

However, the implementation can be further simplified. For example, boundaries C and D can be combined to give:

$$\text{E: sgn } (y''_{k-2} - (f_1 - f_2) y_k + (f_1 - f_2) a_{k-3}) \quad \text{Equation 6}$$

By substituting for $y'_{k-1}$ and $y''_{k-2}$ using equations (2) and (3), the following relations are obtained for the three decisional planes:

A: sgn $(y_{k-2} + f_1 y_{k-1} + \Delta A)$

B: sgn $(y_{k-2} + f_1 y_{k-1} + \Delta B)$

E: sgn $(y_{k-2} + f_1 - f_2) y_k + \Delta E)$

In this version of the present invention, a logic circuit can provide an output based on boundaries A, B and E. Boundary E is not monotonically related to boundaries A and B. The resulting detector can be further simplified by setting $(f_1 - f_2) = 1$ in Equation 4. The effect of this simplification on the detector performance is negligible for channels at the symbol densities at interest. The new slicer plane becomes E': sgn $(y_{k-2} - y_k + \Delta E')$ Table 2 lists the values for $\Delta A$, $\Delta B$, $\Delta E$ and $\Delta E'$ for different combinations of $a_{k-3}$ and $a_{k-4}$.

TABLE 2

Offset Values for Slicer Planes

| $a_{k-3}$ | $a_{k-4}$ | $\Delta A$ | $\Delta B$ | $\Delta E$ | $\Delta E''$ |
|---|---|---|---|---|---|
| 1 | 1 | $-2f_1 - f_2 - f_1 f_2$ | $-f_2 - f_1 f_2$ | $-2f_2$ | $-f_1 - f_2 + 1$ |
| 1 | -1 | $-2f_1 + f_2 - f_1 f_2$ | $f_2 - f_1 f_2$ | 0 | $-f_1 - f_2 + 1$ |
| -1 | 1 | $-f_2 + f_1 f_2$ | $2f_1 - f_2 + f_1 f_2$ | 0 | $f_1 - f_2 - 1$ |
| -1 | -1 | $f_2 + f_1 f_2$ | $2f_1 + f_2 + f_1 f_2$ | $-2f_2$ | $f_1 + f_2 - 1$ |

Figure 5:
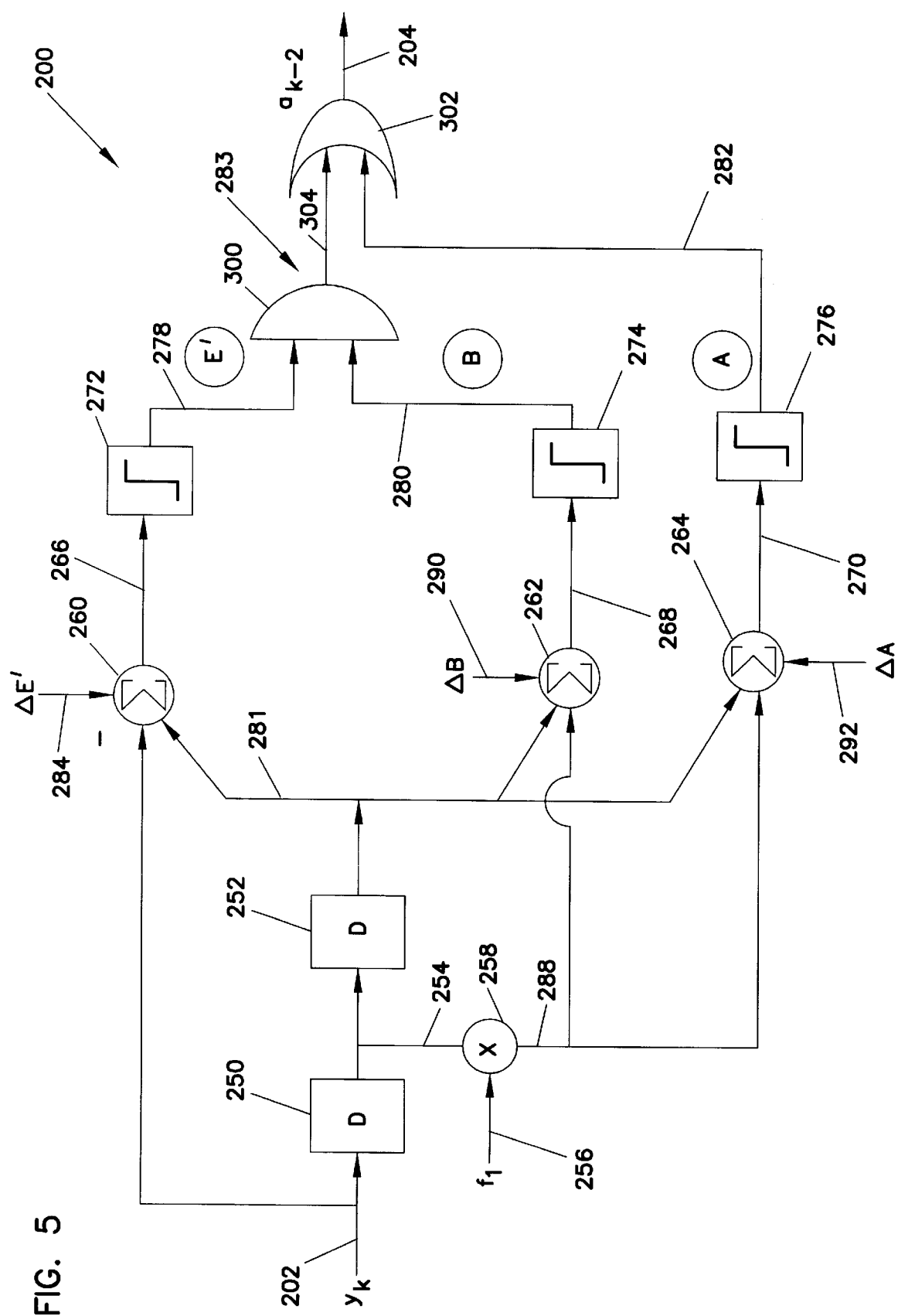
FIG. 5 is a schematic representation of a detector embodying features of the present invention shown in the block diagram of FIG. 3.

FIG. 5 shows a block diagram of a preferred embodiment of detector 200 constructed in accordance with the present invention. The detector 200 receives input $y_k$ 202 and provides a decision as to $a_{k-2}$ 204. The detector 200 includes delays 250 and 252 connected in cascade where delay 250 receives $y_k$ 202. The output 254 of delay 250 and $f_1$ 256 are provided to a multiplier 258. The detector 200 also includes three adders 260, 262, 264, each of which provides an output 266, 268, 270, respectively, to an amplitude gate, or slicer 272, 274, 276, respectively. The outputs 278, 280, 282 of slicers 272, 274, 276 represent the boundary terms A, B, and E', respectively, and are provided to a logic function 283 which then provides the detector output 204. The multiplier used in the calculation of boundaries A and B 258 makes the two boundaries dynamic, as opposed to the boundary term E', the slope of which is constrained.

The detector input 202 is subtracted from the output 281 of delay 252 and added to the offset value of $\Delta E'$ 284 to produce output 266 from adder 260. Adder 262 provides the sum of the output 288 of multiplier 258, the output 281 of delay 252 and the offset value of $\Delta B$ 290. Adder 264 provides the sum of the output 288 of multiplier 258, the output 281 of delay 252 and the offset value of $\Delta A$ 292. The offset values of $\Delta A$ 292, $\Delta B$ 290, and $\Delta E'$ 284 are shown in Table 2, and are based on different combinations of $a_{k-3}$ and $a_{k-4}$. Thus, the offset values 284, 290, 292 can be implemented as 2-input multiplexers, look-up tables, or the like, and provided to the respective adders 260, 262, 264.

The logic function 283 in general is determined based on the set of boundaries. The logic function maps the boundary regions created by the signal space to a binary output that corresponds with the estimated NRZI output of the detector 200. With the embodiment of the present invention shown in FIG. 5, a signal space can be determined and the logic function obtained by inspection. The detector 200 includes AND gate 300 which operates on outputs 278 and 280, and OR gate 302 which operates on the output 304 of AND gate 300 and output 282 to provide signal 204.

The present invention includes advantages over the prior art. Among these advantages is the detector can be implemented with a relatively simple architecture yet can achieve the performance typically realized in only much more complex designs over a wide range of user densities.

It is to be understood that even though numerous characteristics and advantages of various embodiments of the present invention have been set forth in the foregoing description, together with details of the structure and function of various embodiments of the invention, this disclosure is illustrative only, and changes -may be made in detail, especially in matters of structure and arrangement of parts within the principles of the present invention to the full extent indicated by the broad general meaning of the terms in which the appended claims are expressed. For example, the particular elements may vary depending on the particular application for the detector while maintaining substantially the same functionality without departing from the scope and spirit of the present invention. In addition, although the preferred embodiment described herein is directed to a detector for use with MTR coding, it will be appreciated by those skilled in the art that the teachings of the present invention can be applied to other information handling systems, without departing from the scope and spirit of the present invention.

What is claimed is:

1. A circuit suitable for use with an information handling system, the circuit comprising:
   an equalization circuit for deriving an equalized input signal having an uncorrelated noise signal component, the equalized input signal responsive to a sampled input signal; and
   a detector, operably coupled to the equalization circuit, for determining at least a first, second, and third decision boundary based on the equalized input signal, the first and second boundaries being monotonically related and rotatable, and the third boundary including a constrained slope.

2. The circuit of claim 1 where the boundaries form decision regions that map estimated input symbols in a three-dimensional signal space.

3. The circuit of claim 2 wherein two boundaries are combined to provide the third boundary.

4. The circuit of claim 1 wherein the detector includes a decision means, operably coupled to the detector for providing a stream of detected data symbols based on three boundaries.

5. The circuit of claim 4 wherein the equalization circuit includes:
   a low-pass filter responsive to the sampled input signal for providing a front filter signal;
   a forward filter, operably coupled to the low-pass filter to receive the front filter signal, for providing forward filter signal having an arbitrary target shape and removing precursor inter-symbol interference terms from the front filter signal;
   a feedback filter, operably coupled to the decision means for providing a feedback signal having two post-cursor inter-symbol interference terms from the stream of detected data; and
   a combiner combining the feedback and front filter signals to provide the equalized input signal.

6. The circuit of claim 1 wherein the equalization circuit includes an equalizer to minimize mean-squared error in the sampled input signal.

7. The circuit of claim 1 wherein the equalization circuit includes an equalizer to uncorrelate noise in the sampled input signal.

8. A magnetic disc drive, comprising:
   a rotatably mounted disc suitable for storing thereon a bit stream of data; and
   a transducer operably coupled to receive the bit stream of data and for providing a data signal to a read/write channel, the read/write channel providing a sampled input signal and comprising:
      an equalization circuit for deriving, with an uncorrelated noise signal component, an equalized input signal responsive to the sampled input signal; and
      a detector, operably coupled to the equalization circuit, for determining at least first, second, and third decision boundaries based on the equalized input signal, the first and second boundaries being monotonically related and rotatable and the third boundary including a constrained slope, wherein the detector includes a logic circuit, operably coupled to the detector, for providing a stream of detected data based on the three decision boundaries.

9. The magnetic disc drive of claim 8 wherein the equalized input signal includes first and second post-cursor inter-symbol interference terms.

10. The magnetic disc drive of claim 9 wherein the detector includes first and second logical AND circuits, each for receiving a signal representative of a twice-delayed equalized input signal, a signal from a multiplier representative of a once-delayed equalized input signal multiplied by the first post-cursor inter-symbol interference term, and offset signals based on the first and second post-cursor inter-symbol interference terms such that the first logical AND circuit receives a first offset signal and the second logical AND circuit receives a second offset signal, the logical AND circuits each providing an output to the logic circuit.

11. The magnetic disc drive of claim 10 and further comprising a third logical AND circuit for receiving the equalized input signal, the signal representative of a twice-delayed equalized input signal and a third offset signal based on the first and second post cursor inter-symbol interference terms, the third logical AND circuit providing an output to the logic circuit.

12. The magnetic disc drive of claim 11 wherein the logic circuit includes an AND gate and an OR gate and wherein the outputs of the second and third logical AND circuit are provided to the AND gate, and the outputs of the AND gate and the first logical AND circuit are provided to the OR gate, which provides the stream of detected data.

13. The magnetic disc drive of claim 11 wherein the outputs of the logical AND circuits are each provide through slicers operably coupled to the logic circuit.

14. The magnetic disc drive of claim 8 wherein the bit stream of data is encoded with a maximum transition run length code.

15. A method for detecting digital data, comprising steps of:
   deriving equalized input symbols responsive to a sampled input signal representative of a bit stream of data stored on a magnetic medium;
   defining decision regions having at least three boundaries based on the sampled input signal, at least two of the three boundaries being monotonically related and rotatable and one of the boundaries having a constrained slope;
   mapping the equalized input symbols into the decision regions; and
   generating estimated symbols based on the mapped equalized input symbols.

16. The method of claim 15 wherein defining decision boundaries comprises:
   defining four boundaries; and
   combining two boundaries to form a new third boundary.

17. The method of claim 15 wherein deriving equalized input symbols comprises:
   whitening noise in the sampled input signal.

18. The method of claim 17 wherein whitening noise comprises:
   low pass filtering the sampled input signal to provide a first filtered signal;
   removing precursor inter-symbol interference from the first filter signal to provide a second filtered signal;
   feeding back post-cursor inter-symbol interference terms; and
   combining the second filtered signal with the post-cursor inter-symbol interference terms to provide the equalized input symbols.

* * * * *

UNITED STATES PATENT AND TRADEMARK OFFICE
CERTIFICATE OF CORRECTION

PATENT NO. : 6,061,193
DATED : May 9, 2000
INVENTOR(S) : Rub et al.

It is certified that error appears in the above-identified patent and that said Letters Patent is hereby corrected as shown below:

Equations:

Eq. 5, Col. 7, line 8, delete "$(P_1P_2)$", insert --$(p_1 - p_2)$--.

Col. 7, line 16, delete "$f_1 0$", insert --$f_1 = 0$--.

Col. 7, line 32, delete "-1", insert -- =-1 --.

Col. 7, line 34, delete "$(F_1F_2)$", insert --$(f_1 - f_2)$--.

Signed and Sealed this

Seventeenth Day of April, 2001

Attest:

NICHOLAS P. GODICI

Attesting Officer

Acting Director of the United States Patent and Trademark Office